United States Patent [19]
Thatcher

[11] 3,743,025
[45] July 3, 1973

[54] RECIPROCATING SOIL AERATOR WITH FLEXIBLE TOOL GUIDE ASSEMBLY

[76] Inventor: Richard E. Thatcher, 6832 Westcott Drive, Richmond, Va. 23235

[22] Filed: July 1, 1970

[21] Appl. No.: 51,492

[52] U.S. Cl. .................... 172/21, 172/84, 172/438, 56/16.9
[51] Int. Cl. ............................................ A01b 45/02
[58] Field of Search ................. 172/21, 22, 91, 53, 172/93, 101; 56/249, 255; 308/3, 3.9; 29/6

[56] References Cited
UNITED STATES PATENTS

| | | | |
|---|---|---|---|
| 3,429,378 | 2/1969 | Mascaro | 172/22 |
| 2,730,856 | 1/1956 | Mekalainas | 56/249 |
| 2,206,264 | 7/1940 | Rose | 172/21 |
| 2,908,127 | 10/1959 | Craig | 56/249 |
| 2,231,821 | 2/1941 | Sprouse | 56/249 |
| 3,102,375 | 9/1963 | Troka et al. | 56/255 |
| 2,056,337 | 10/1936 | Archibald | 172/21 |
| 2,722,795 | 11/1955 | Warner | 56/249 |
| 2,032,777 | 3/1936 | Thomas | 56/249 |
| 3,204,703 | 9/1965 | Hansen | 172/21 |
| 2,800,066 | 7/1957 | Cohrs et al. | 172/93 |
| 2,838,986 | 6/1958 | Fessel | 172/21 |
| 2,193,575 | 3/1940 | Thompson | 172/93 |
| 3,022,834 | 2/1962 | Ruka et al. | 172/53 |
| 2,364,109 | 12/1944 | Taylor | 29/6 |
| 2,242,223 | 2/1880 | Price | 172/707 |
| 753,312 | 3/1904 | Quickel | 172/707 |

FOREIGN PATENTS OR APPLICATIONS

| | | | |
|---|---|---|---|
| 463,136 | 3/1937 | Great Britain | 172/612 |

*Primary Examiner*—Robert E. Pulfrey
*Assistant Examiner*—C. W. Hanor
*Attorney*—Griffin, Branigan & Kindness

[57] ABSTRACT

Soil aerator having flexible tines which pivot about a movable pivot means is disclosed. Driven ends of the tines are driven in substantially circular motions while the flexible tines are simultaneously guided and pivoted by links of chains. Penetrating ends of the tines "walk" over the surface of the soil under the guidance of the chains. In this manner, the tines are permitted to pierce the soil without kicking up debri and without undue stress on the tines so that the tines can be small and flexible. Because the aerator disclosed herein kicks up such little debri, it can be mounted on lawn mower frames and used simultaneously with both reel and rotary type lawn mowers. Two such combinations are disclosed herein.

15 Claims, 8 Drawing Figures

PATENTED JUL 3 1973 3,743,025

INVENTOR
RICHARD E. THATCHER

BY Griffin, Branigan & Kindress
ATTORNEYS

INVENTOR
RICHARD E. THATCHER

BY Griffin, Branigan & Kindness
ATTORNEYS

INVENTOR
RICHARD E. THATCHER

BY Griffin, Branigan & Kindness

ATTORNEYS

RECIPROCATING SOIL AERATOR WITH FLEXIBLE TOOL GUIDE ASSEMBLY

BACKGROUND OF THE INVENTION

This invention relates to soil conditioning apparatus and more particularly, to apparatus for conditioning lawns.

Plants, particularly lawns, often suffocate because the earth becomes hard and the lawn's roots cannot breathe or obtain proper nourishment. Hence, experts have long recognized the merit of soil aeration for the purpose of reconditioning a lawn. Soil aeration usually involves piercing and loosening soil around roots so that the roots can receive proper oxygen, nourishment, and moisture.

Prior art aerators are not widely used by individuals to care for their lawns because they are expensive, easily damaged, and entail extra work. Ideally, a home type aerator should be mountable onto a power lawn mower so that a lawn can be aerated at the same time it is being mowed. Moreover, as a power mower attachment, an aerator costs less than a separate unit.

Many presently available soil aerators have flails or slicers which beat or cut the ground to both remove thatch and aerate. These devices, however, require that the turf be raked or otherwise reworked after aeration, thus, they create more work. Moreover, if such devices are used as attachments for a reel type lawn mower they tend to kick debri into the reel and cause damage to the reel's blades.

An example of a power mower aerator attachment is shown in U. S. Pat. No. 3,455,398 to Bowers where aerator flails are mounted on a power mower. In that case, however, the mower's cutting blade must be removed when the aerator flails are in operation. Hence, the device can only perform one operation at a time.

There are also a number of prior art soil aerators which are intended to prevent undue tearing of the turf during operation of the aerator. One example of such a soil aerator is described in U. S. Pat. No. 2,056,337 to Archibald wherein rigid vertically extending spikes are walked along the earth surface. In Archibald's design, the spike must be unduly long and the structure is, therefore, not appropriate for mounting on a power lawn mower. Also, Archibald's rigid spikes tend to both kick up the turf and create difficulties when they strike unyielding objects in the ground. Another example of a conventional aerator is found is U. S. Pat. No. 2,206,264 to Rose. Again, however, this device is not suitable for mounting on a power lawn mower because of its shape and size and rigidness of its spikes.

In short, most prior art aerators are not suitable for tandem operation with a power lawn mower because of their size and mode of operation. It is therefore an object of this invention to provide a soil aerator which can be mounted on either a reel type lawn mower or a rotary type lawn mower for tandem operation with the lawn mower.

Another object of this invention is to provide a compact, inexpensive soil aerator which does not kick up debri.

SUMMARY OF THE INVENTION

According to principles of the invention, each of a plurality of tines has a penetrating end, a driven end, a shock absorbing coil and a guiding shank. Each driven end is wound in a coil about a hardened journal on a crank shaft made up of a plurality of individual arm elements into an integral shaft. Each tine extends downwardly so that its guiding shank passes between a pair of rollers on a preferably flexible guide member. As the shaft is rotated, the tines reciprocate into and out of the soil while at the same time "walking" over the surface under guidance of the rollers on the flexible guide. In this manner, the tines are permitted to pierce the soil without kicking up debri and without undue stress on the tines so that the tines can be made smaller and more flexible than those on prior art aerators. In addition, the particular construction of the shaft permits it to be both economically manufactured and easily disassembled for convenient tine replacement. Moreover, because the above described structure is both compact and light weight, it is conveniently adapted to be pivotably mounted on a power reel type lawn mower so that it can be brought into selective engagement with the power mower's drive as well as adjusted to various heights in order to accommodate uneven ground.

BRIEF DESCRIPTION OF THE DRAWINGS

The foregoing and other objects, features and advantages will be apparent from the following more particular description of a preferred embodiment of the invention, as illustrated in the accompanying drawings in which reference characters refer to the same parts throughout the different views. The drawings are not necessarily to scale, emphases instead being placed upon illustrating the principles of the invention in a clear manner.

DESCRIPTION OF A PREFERRED EMBODIMENT

Figure 1:
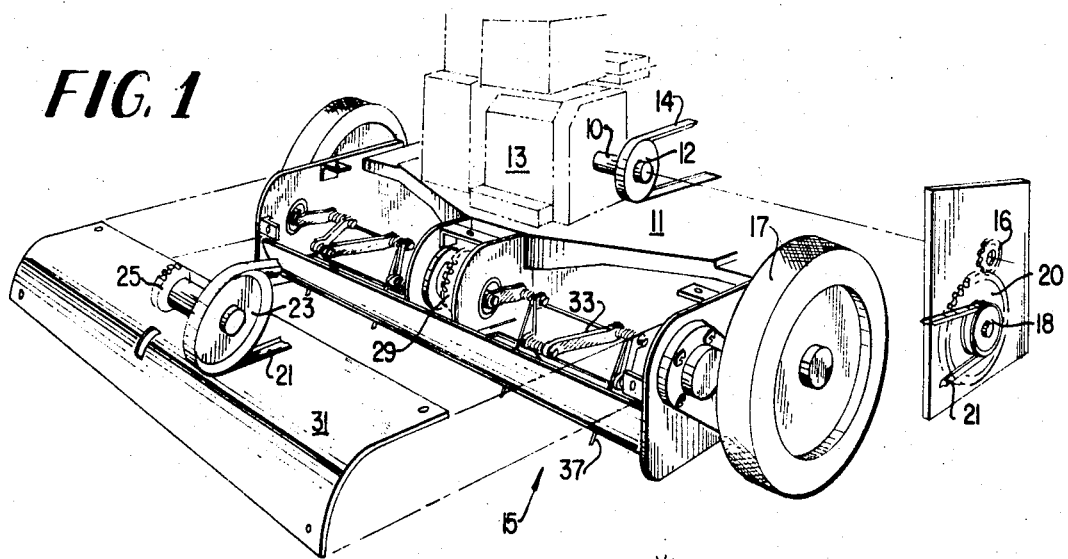
FIG. 1 is a perspective view of an aerator employing the principles of the invention and mounted on a reel type power lawn mower, with portions removed for clarity.

Referring to the drawings and more particularly to FIG. 1, a lawn mower frame 11 is shown having a motor 13 and an aerator assembly 15 mounted on it. Also mounted on the lawn mower frame 11 is a cutting reel 9 not shown in FIG. 1 but shown in FIG. 4 (for cutting grass). The motor 13 provides power to lawn motor wheels 17 and to the cutting reel through a drive shaft 10, a motor pulley 12; and a reel drive belt 14. The motor also provides power to the aerator assembly through the drive shaft 10; an 18 tooth gear 16 which turns with the drive shaft 10; a 48 tooth gear 20 which is driven by the 18 tooth gear; and intermediate pulley 18 which rotates with the 48 tooth gear 20; an aerator drive belt 21 which is driven by the pulley 18; a drive pulley 23; an upper sprocket 25; an aerator drive chain 27 (FIG. 4); and, a lower sprocket 29. The lower sprocket 29 directly drives the aerator assembly 15 as will be explained in greater detail below.

Figure 2:
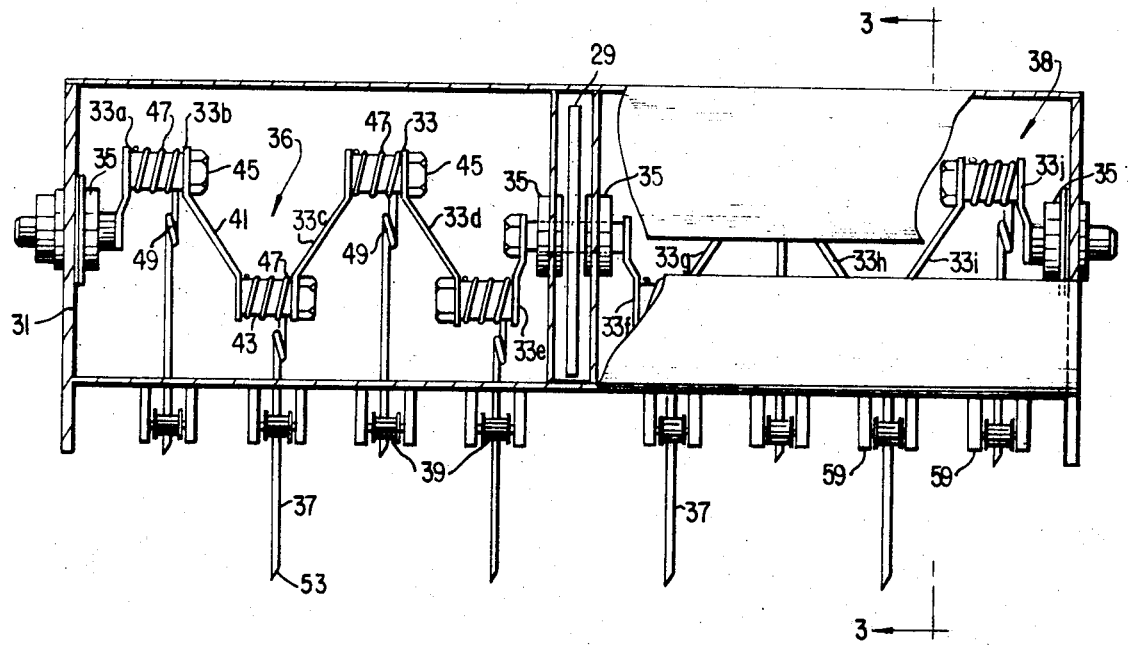
FIG. 2 is a front view of the aerator shown in FIG. 1 with portions removed.
Figure 3:
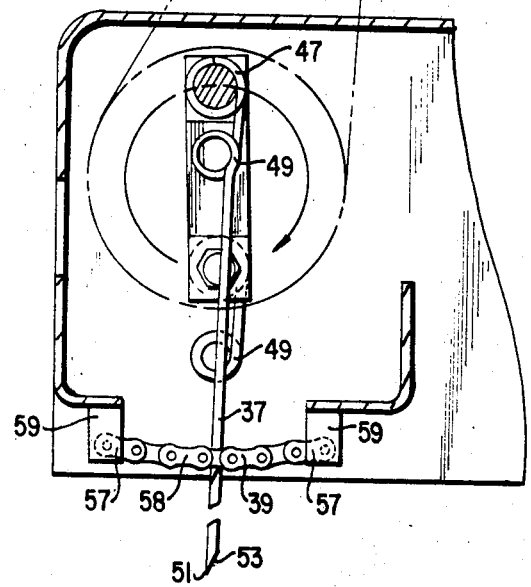
FIG. 3 is a view taken along line 3—3 in FIG. 2.

The aerator assembly 15 comprises an aerator housing 31, a crankshaft 33, (see also FIG. 2) the lower sprocket 29, crankshaft bearings 35, tines 37 and roller chains 39 (see also FIG. 3). The crankshaft 33 is comprised of left hand and right hand sections 36 and 38 with the outer ends of each half being mounted in the crankshaft bearings 35 at the outer end of the aerator housing 31. The lower sprocket 29 is connected to the center of the crankshaft so as to drive both of its halves when power is transmitted from the motor 13 as explained above. The crankshaft sections are comprised of individual cranks 33a–j which are joined together to form an integral structure. Each crank 33a–j is made up of two parts — an arm 41 and a hardened journal 43. In this regard, each individual crank is economically fabricated by drop forging. The end cranks 33a, e, f, and 33j are shorter than the other cranks because they only need to extend to the shaft' s axis.

Figure 5:
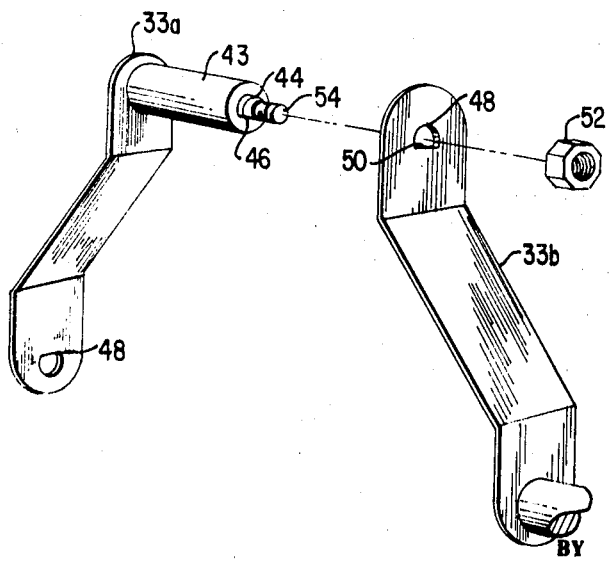
FIG. 5 is an exploded view of individual cranks 33a and 33b which are shown in FIG. 2.

With reference to FIG. 5 wherein is shown an exploded view of two cranks, on one of the ends of each of the hardened journals 43 are studs 44 which are rounded over most of their outer surfaces, but which respectively have at least one flat side 46. Corresponding holes 48 in the other ends of the cranks have flat sides 50 which fit the flat sides 46 of the studs 44. The cranks are held together by nuts 52 which are screwed onto threaded portions 54 of the studs 44. Thus, the flat portions of the studs 44 and the holes 48 register with one another to provide a rigid crankshaft assembly. It should be particularly noted that no keys or pins are required.

The upper end of each tine 37 forms a horizontal coil 47 which is freely mounted on one of the hardened journal parts 43 which rotates within its coil. Each tine 37 also has a vertical coil 49 which adds flexibility to the tine 37. The tines 37 have circular cross sections with a diameter of from one-eighth of an inch to three sixteenths of an inch. This relatively thin diameter also adds flexibility to the tines 37, cuts down on the structure's weight, and provides for easier penetration of the earth. The tips of the tines are cut on an angle along planes 53 (FIGS. 2 and 3) to provide a chisel point. In this manner, the soil is merely "parted" by the tines, rather than being compacted downwardly as occurs in prior art aerators which require relatively large plunger rods for making holes in the soil as well as larger and more powerful motors.

It can be seen in FIG. 3 that each tine 37 rides between two rollers of one of the roller chains 39 mounted at each end 57 to blocks 59 which are a part of the aerator housing 31. Although not shown in the drawings, in one embodiment a shaft extends through each linear group of blocks so that a front shaft is used to hold the front ends of all the chains 39 and a back shaft is used to hold all the back ends of the chains 39. In this regard, as shown in FIG. 3, the roller chains are mounted somewhat loosely between the blocks 59. This looseness has a purpose which will be described below.

Figure 4:
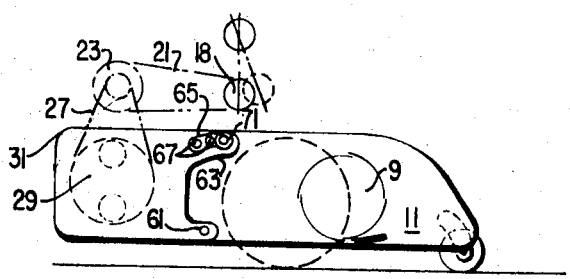
FIG. 4 is a side elevational view of an aerator employing principles of this invention mounted on a reel type mounted lawn mower.

As shown in FIG. 4, the aerator housing 31 is attached to the lawnmower frame 11 by a hinge 61. Aerator housing tabs 63 have slots 65 extending outwardly from the aerator housing along the sides of the lawn mower frame 11 at a point where lawn mower frame 11 has a series of holes 67. An intermediate pulley 18 which provides power to the belt 21 is adjustable to the left and right as seen in FIG. 4 (adjusting means not shown). A mounting bolt 71 is inserted through the slot 65 in one of the series of holes 67. In this regard, the mounting bolt 71 is normally positioned at the right end of the slot 65 as shown in FIG. 4. If it is desired to raise the aerator housing 31 to reduce penetration of the soil by the tines 37, the mounting bolt 71 is moved to another hole to the right. Similarly, the drive pulley 18 is movable to the left or right as shown in FIG. 5 to adjust the tension on belt 21 during the various positions of the bolt 71.

In operation, referring to FIG. 1, the motor 13 acts through the drive shaft 10, and the motor pulley 12 to eventually cause a lawn mower drive chain to drive the lawn mower wheels 17 so that the lawn mower frame moves along the ground in a forward direction. At the same time, the motor 13 acts through the drive shaft 10 and the change gears (18 tooth gear 16 and 48 tooth gear 20) to turn the pulley 18 and the belt 21 which, in turn, operates through the pulley 23, the upper sprocket 25, the aerator drive chain 27 and the lower sprocket 29 to cause the crankshaft 33 to rotate. The change gears (18 tooth gear 16 and 48 tooth gear 20) are to reduce rotational velocity and to reverse rotational direction. It should be noted that both the lawn mower power linkage and the aerator power linkage include clutch mechanisms which allow an operator to selectively engage and disengage them; however, the clutches are not shown in the drawings for the sake of clarity.

It can be seen in FIG. 2 that rotation of the crankshaft 33 causes the tines 37 to reciprocate up and down, half the tines passing into the soil at one time and the other half being raised above the soil at the same time. As the tines 37 reciprocate up and down, they also pivot about pivot link 58 of the roller chain 39 (FIG. 3). Thus, the tips 51 of the tines are caused to move in a "walking" motion. That is, the tips 51 which are in the soil move forward at a linear speed approximately equal to the forward speed of the lawn mower frame 11.

Figure 6:
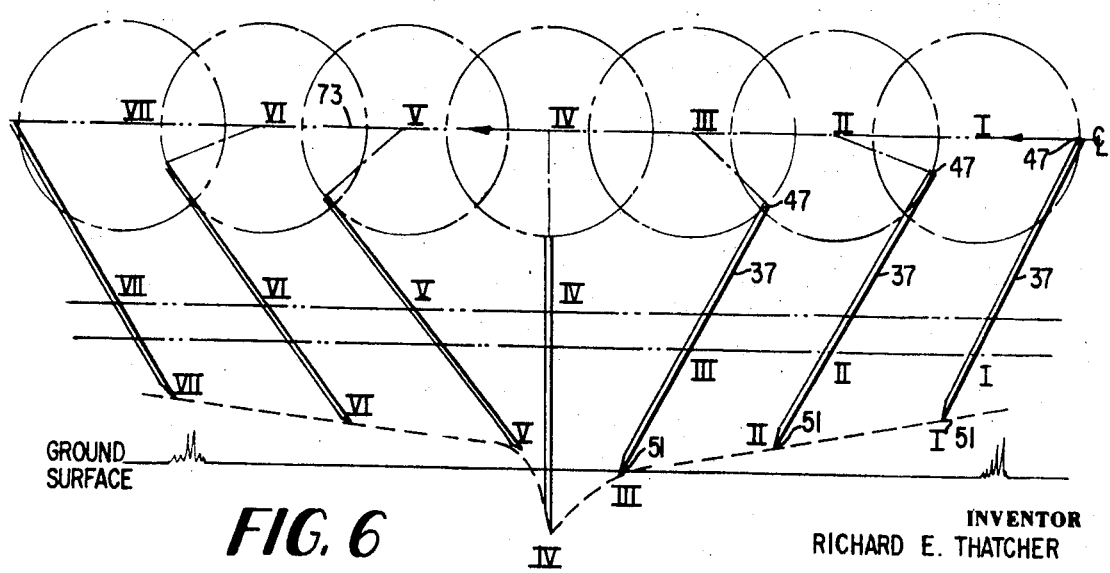
FIG. 6 is a diagrammatical representation of the movement of the tines of an aerator which employs the principles of this invention.

FIG. 6 provides a more accurate explanation of the motion of the tips of the tines. FIG. 6 shows schematically the motion of tine 37 as it goes through the one-half cycle in which its tip 51 is in the soil. A horizontal scale 73 represents forward horizontal motion of the lawn mower frame 11; and four series of Roman numerals represent the respective time positions of the lawn mower frame 11, a coil 47, a movable pivot point which is provided by a roller chain, and tips 51. It should be particularly noted and appreciated that the movable pivot point undulates upwardly between time-positions III and V. It should also be noted that the chart in FIG. 5 assumes a rigid tine as opposed to the flexible tines used in this invention.

As shown in FIG. 6, tip 51 enters the soil at entrance point 74 and leaves the soil at exit point 76. It can be seen in FIG. 6 that the tip 51 does not move backwardly at any time while it is in the soil as do most prior art soil aerators. Thus, soil and debri is not kicked up into the reel of a reel type lawn mower.

My invention avoids the above mentioned debri problem by employing a movable pivot point. That is, the roller chains 39 and the flexible tines 37. The roller chains 39 allow the tines 37 to be held in a semi-fixed position as the tips 51 enter and exit from the soil. The tines, upon entering, push downwardly and backwardly on the roller chain 55 thus assuring full penetration. On the upward stroke, each roller chain 39 flexes upwardly thus allowing the tine 37 to be retracted from the soil more rapidly. In other words, the roller chains 39 tend to undulate as the tines 37 enter and exit from the soil.

The tines are flexible because of the small diameters and because of the shock absorbing vertical coils 49. The flexible tines 37 tend to flex, therefore, so that their tips 51 can remain in a relatively fixed position after they enter the soil. The motion of the roller chain 39 and the forward motion of the center line of the crankshaft 33 nullify any tendency the tips 51 may have to move backwardly in the soil as compared with the movement of prior art aerator tine tips. Because there is reduced tip movement in the soil, there is very little debri kicked up onto the surface of the soil and the aerator can be used with a reel type lawn mower.

The flexibility of the tines 37 has a further advantage in that they absorb the shock load encountered when striking a solid object in the soil. Also, the roller chain 39 allows side to side movement which further allows the flexible tines 37 to absorb shock loads, and to slide off of smaller solid objects.

Figure 7:
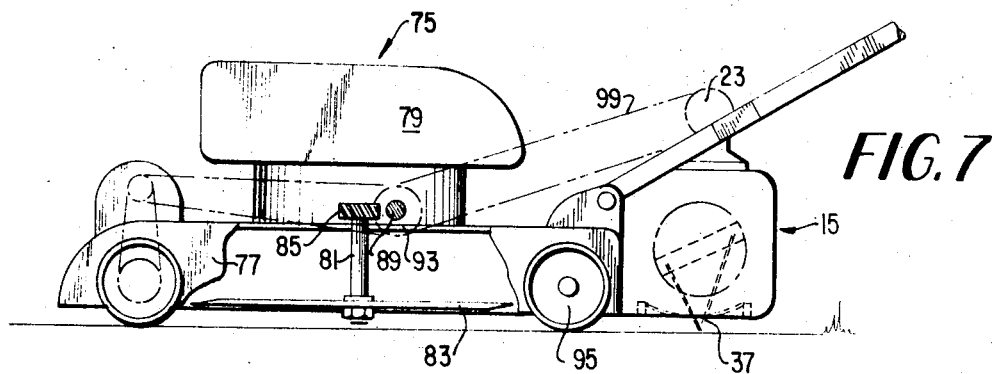
FIG. 7 is a partially cutaway side view of an aerator which employs the principles of this invention mounted on a rotary type lawn mower; and, FIG. 8 is a partially cutaway top view of the device shown in FIG. 7.
Figure 8:
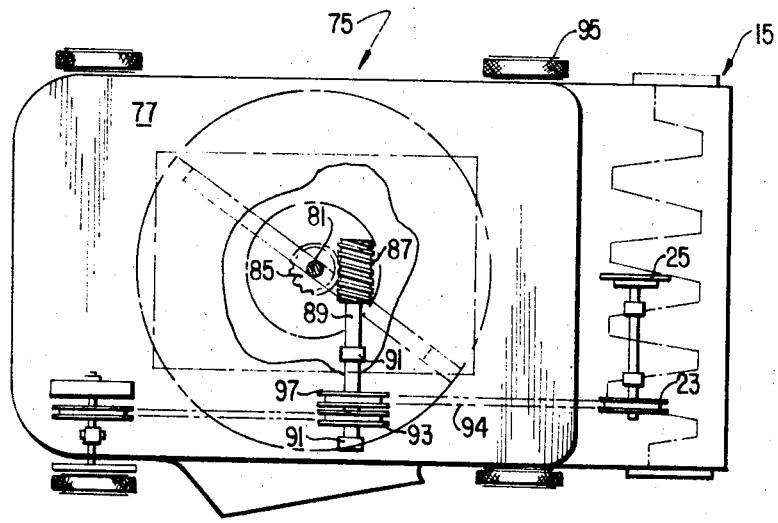

FIGS. 7 and 8 show an aerator which employs the principles of this invention mounted on a rotary type lawn mower. Referring to FIGS. 7 and 8, an aerator assembly 15, which is similar to the aerator assembly already described, is mounted onto the rear end of a rotary type lawn mower 75.

In the context of this invention, the essential features of the lawn mower 75 are: a rotary mower frame 77; a motor 79 which is mounted on the rotary mower frame 77; a motor drive shaft 81 which is driven by the motor 79; a rotary cutting blade 83 which is driven by the motor drive shaft 81; a power takeoff gear 85 which is also driven by the motor drive shaft 81; a worm gear 87 which is driven by the power takeoff gear 85; a power takeoff shaft 89 which is attached to the worm gear 87 and which rides in bearings 91; a wheel drive pulley 93 which is driven by the power takeoff shaft 89 and which cooperates with other linkage to drive wheels 95 of the rotary lawn mower; and an aerator drive pulley 97 which is also driven by the power takeoff shaft 89 and which cooperates with a belt 99 to provide power to the aerator assembly 15.

The aerator assembly 15 has power linkage provided by an aerator drive pulley 23, an upper sprocket 25 and an aerator drive chain which is similar to that described above in conjunction with FIGS. 1 through 6. Further, in other respects, the aerator 15 is similar to the aerator described above in conjunction with FIGS. 1 through 6.

The aerator of this invention is not only effective but it is inexpensive and practical. The crankshaft cranks 33a-j can be easily disassembled or replaced with new cranks or for removing and mounting the tines 37. In addition, the tines are durable and inexpensive. Operation of the aerator is relatively trouble free because it is not significantly affected by foreign objects in the soil. The capability of mounting on a reel type lawn mower adds to the economic attractiveness of the device. Similarly, it can be appreciated that the aerator disclosed herein is compact yet sturdy, does not kick up debri or disturb plant roots, can be mounted on reel or other types of power mowers, is inexpensive, and is easy to operate. Further, larger aerators which employ the principles of this invention can be pulled by yard tractors.

While the invention has been particularly shown and described with reference to a preferred embodiment, it will be understood by those skilled in the art that various changes in form and detail may be made therein without departing from the spirit and scope of the invention. For example, the tine tips 51 can have a variety of shapes such as spade shapes or barbed shapes to cut and tear if desired.

The embodiment of the invention in which an exclusive property or privilege is claimed are defined as follows:

1. A soil aerator of the type used for loosening top soil at and below its surface comprising:
   an aerator frame which moves along the soil's surface;
   an elongated tool means for penetrating the soil's surface, said tool having a driven portion and a penetrating end;
   a driving means which is pivotally attached to said driven portion for rotating said driven portion thereby reciprocating said elongated tool means; and
   an elongated flexible pivoting assembly having first and second ends each of which are affixed to said frame at stationary locations relative to said frame, said pivoting assembly being spaced along said elongated tool from said driven portion for pivoting said elongated tool as said driving means rotates said driven portion, said elongated flexible pivoting assembly including a movable pivoting portion intermediate said first and second ends on which said elongated tool pivots and flexible pivot mounting portions mounting said movable pivoting portion to said respective stationary locations on said aerator frame and for allowing said movable pivoting portion freedom of movement due to flexing of said mounting portions relative to said aerator frame during operation of said soil aerator to loosen top soil.

2. A soil aerator as claimed in claim 1 wherein said elongated flexible pivoting assembly comprises a chain which has first and second chain ends.

3. A soil aerator as claimed in claim 2 wherein are further included chain support members at said stationary locations on said aerator frame, and wherein:
   said chain is extended between said chain support members; and,
   said elongated tool means extends through said movable pivoting portion of said chain.

4. A soil aerator as claimed in claim 3 wherein said elongated tool means is a thin flexible tine and wherein said penetrating end is sharp.

5. A soil aerator as claimed in claim 4 wherein said thin flexible tine comprises a spring portion located between said driven portion end and said penetrating end.

6. A soil aerator as claimed in claim 5 wherein said driven portion of said flexible tine is driven by a crankshaft which comprises selectively separable cranks.

7. A combination soil aerator and lawn mower, said soil aerator being used for loosening top soil at and below its surface and said lawn mower being used for cutting grass growing in said soil, comprising:
   a frame;

a lawn mower assembly mounted on said frame;
a soil aerator assembly mounted on said frame; and,
power means for simultaneously driving said lawn mower assembly and said soil aerator assembly, wherein said soil aerator assembly comprises:
an elongated tool means for penetrating the soil's surface, said tool means having a driven portion and a penetrating end;
a linkage means, which is pivotally attached to said driven portion for rotating said driven portion in response to said power means, thereby reciprocating said elongated tool means; and
an elongated flexible pivoting assembly having first and second ends each of which are affixed to said frame at stationary locations relative to said frame, said pivoting assembly being spaced along said elongated tool from said driven portion for pivoting said elongated tool as said driving means rotates said driven portion, said elongated flexible pivoting assembly including a movable pivoting portion intermediate said first and second ends on which said elongated tool pivots and flexible pivot mounting portions mounting said movable pivoting portion to said respective stationary locations on said frame and for allowing said movable pivoting portion freedom of movement due to flexing of said mounting portions relative to said frame during operation of said soil aerator to loosen top soil.

8. A combination soil aerator and lawn mower as claimed in claim 7 wherein said lawn mower assembly includes a reel type cutting mechanism.

9. A combination soil aerator and lawn mower as claimed in claim 8 wherein said aerator assembly is mounted on said frame in front of said reel cutting mechanism.

10. A combination soil aerator and lawn mower as claimed in claim 7 wherein said elongated flexible pivoting assembly comprises a chain which has first and second chain ends.

11. A combination soil aerator and lawn mower as claimed in claim 10 wherein are further included chain support members mounted on said frame at respective stationary locations, and wherein:
said chain is extended between said chain support members; and,
said pivoting portion comprises a segment of said chain through which said elongated tool extends.

12. A combination soil aerator and lawn mower as claimed in claim 11, wherein said elongated tool means is a thin flexible tine and wherein said penetrating end is sharp.

13. A combination soil aerator and lawn mower as claimed in claim 12, wherein said thin flexible tine comprises a spring portion located between said driven portion and said penetrating end.

14. A combination soil aerator and lawn mower as claimed in claim 13 wherein said driven portion of said flexible tine is driven by a crankshaft which comprises selectively separable cranks.

15. A combination soil aerator and lawn mower as claimed in claim 7 wherein said lawn mower assembly has a rotary type cutting mechanism.

* * * * *